United States Patent Office 3,442,102
Patented May 6, 1969

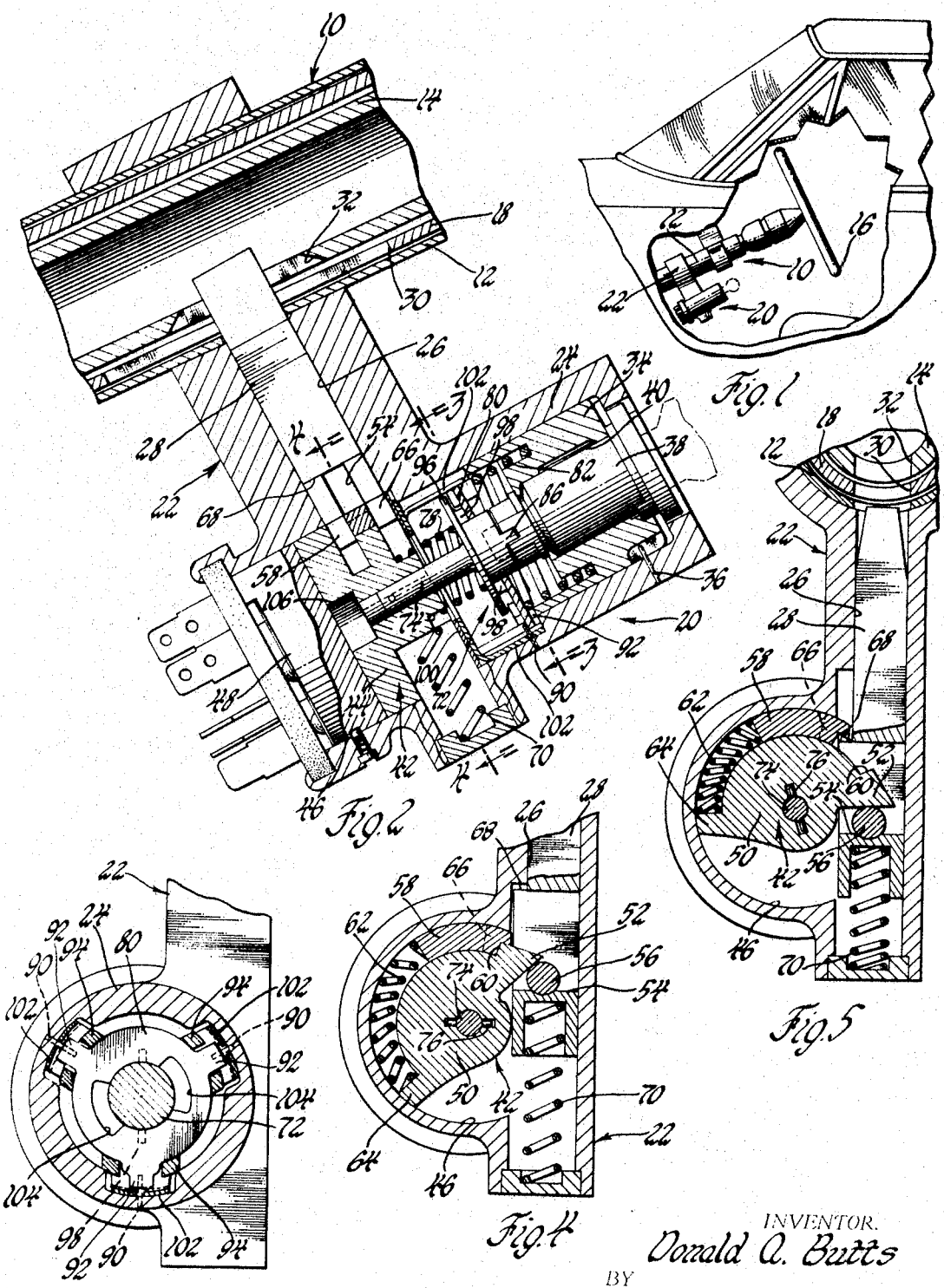

3,442,102
CYLINDER LOCK ACTUATOR
Donald A. Butts, Saginaw, Mich., assignor to General Motors Corporation, Detroit, Mich., a corporation of Delaware
Filed Dec. 14, 1966, Ser. No. 601,599
Int. Cl. E05b 63/00, 15/16; B60r 25/04
U.S. Cl. 70—1.5                                5 Claims

ABSTRACT OF THE DISCLOSURE

The improved cylinder lock actuator is disclosed as embodied in a combined steering column and ignition lock including an ignition switch and a steering column lock bolt actuated by a rotary actuating member responsive to rotation of a lock cylinder. Coupling means which normally couple the lock cylinder to the actuating member are disabled either under unauthorized forced rotation or forced axial movement of the lock cylinder within its housing intended to destroy the tumbler operated side bar or other locking means of the lock cylinder.

---

This invention relates to cylinder locks and more particularly to an improved cylinder lock actuator construction.

Heretofore, cylinder lock actuators employing lock cylinders adapted for authorized selected manipulation of some vehicle control mechanism, as for example an ignition switch or steering column lock bolt, have been subject to unauthorized forced manipulation by rotation of the lock cylinder in a manner destroying its tumbler operated side lock bar or similar locking agency, or by forced axial movement to destroy the lock bar.

One feature of this invention is that it provides a cylinder lock actuator construction answering to the above objections in that the actuator is completely disabled against actuation of the associated mechanism when the lock cylinder is either unauthorizedly forcibly rotated or unauthorizedly forcibly axially displaced in a manner intended to destroy its locking means.

Another feature of this invention is that it provides a cylinder lock actuator construction including coupling means normally coupling the lock cylinder with the mechanism to be actuated but which are automatically and completely disabled against such coupling when the lock cylinder is either forcibly rotated or forcibly axially displaced from its locked condition.

Another feature of this invention is that the coupling means are held in a coupling position against the action of a biasing spring by a frangible shear structure which is subject to fracture to release the coupling member for movement to uncoupling position when the lock cylinder is either forcibly rotated or forcibly axially displaced.

These and other features of the invention will be readily apparent from the following specification and the drawings wherein:

FIGURE 1 is a partially broken away fragmentary elevational view of a vehicle body including a steering column lock and ignition switch cylinder lock actuator according to this invention;

FIGURE 2 is an enlarged sectional view of a portion of FIGURE 1;

FIGURE 3 is a sectional view taken generally along the plane indicated by lines 3—3 of FIGURE 2;

FIGURE 4 is a sectional view taken generally along the plane indicated by lines 4—4 of FIGURE 2 showing the steering column lock bolt in locking position; and FIGURE 5 is a view similar to FIGURE 4 showing the steering column lock bolt in a withdrawn unlocking position.

Referring now particularly to FIGURES 1 and 2 of the drawings, a cylinder lock actuator according to the invention is embodied as a combined steering column lock bolt and ignition switch structure mounted in operative association with the steering column 10 of an automotive vehicle. The steering column 10 includes a mast jacket 12 supported on the vehicle and having rotatably disposed therewithin a steering shaft 14 extending from the steering wheel 16 to the vehicle steering gear, not shown. Intermediate steering shaft 14 and the mast jacket is rotatably disposed a shift tube 18 connecting with the vehicle transmission selector.

The cylinder lock actuator, designated generally as 20, includes a housing 22 having a mounting portion secured about the mast jacket 12, a further portion 24 serving as a mounting sleeve for the cylinder lock and associated structure, and a connecting portion having a bolt chamber 26 slidably mounting therewithin a steering column lock bolt 28. The end of bolt 28 is projectable through a circumferential lost motion slot 30 in shift tube 18 into a locking slot 32 in a tubular portion of the steering shaft 14, whereby to prevent rotation of the shaft and maneuvering of the vehicle.

Sleeve portion 24 of the housing 22 has mounted at one end therein a locking sleeve 34 held in rotative fixed position by a shear pin 36 fixed to the sleeve portion 24 and received in a slot in sleeve 34. A lock cylinder 38 of conventional construction is in turn rotatably disposed within the bore of sleeve 34, the lock cylinder including the usual side locking bar 40 or similar locking agency extendible in locked condition into a locking groove of the sleeve, whereby to prevent actuating rotation of the lock cylinder.

Spaced axially of sleeve 34 and lock cylinder 38 is a lock bolt actuating member 42 having a journaling portion 44 thereof rotatably mounted within a lower bore 46 of sleeve portion 24. Attached to portion 44 is the rotor of a conventional rotary ignition switch 48 secured in suitable manner within bore 46. Actuating member 42 and the switch rotor are thus rotatable as a unit between an ignition "off" position, shown in FIGURES 2 through 4, and an "on" position wherein the rotor of the ignition switch 48 closes the ignition and other circuits of the vehicle. Actuating member 42 further includes a cam portion 50 having a tongue 52 oscillatable through a slot 54 provided in lock bolt 28 such that upon clockwise rotation of the actuating member 42 from "off" to "on" positions, the tongue 52 acts upon a pin 56 within slot 54 of bolt 28 to withdraw the bolt from the locking position of FIGURES 2 and 4, to the unlocking position shown in FIGURE 5. The outer surface of cam portion 50 is generally cylindrical and has mounted between it and the wall of bore 46 a detent slug 58 biased against shoulder 60 of tongue 52 by a compression spring 62 seating between the slug and an ear 64 of cam portion 50. As seen in FIGURE 2, the slug 58 includes a portion 66 of a width greater than the cam portion 50 such that the slug remains engaged on the surface of bolt 28 as the latter is slidably withdrawn by the cam portion to unlocking position, whereupon the spring 62 projects the portion 66 into overlapping engagement with a shoulder 68 formed on the bolt thereby to retain the latter out of the slots 30 and 32 of the shift tube and steering shaft, as shown in FIGURE 5.

Selected rotation of the actuating member 42 counterclockwise from the "on" position of FIGURE 5 toward the "off" position of FIGURE 4 rotates the shoulder 60 of tongue 52 through the slot 54 into engagement with the portion 66 of the detent slug 58 such that further rotation disengages the detent slug from lock bolt 28 to allow the latter to be projected into the shift tube and seering shaft slots by a coil compression spring 70 seating between the bolt and housing 22.

Coupling means for coupling the lock cylinder 38 to the actuating member includes a coupling member 72 having a shank portion 74 slidably disposed within a bore of actuating member 42 and having a pin 76 constraining the coupling member to fixed rotative relationship therewith. A coil compression spring 78 between actuating member 42 and coupling member 72 urges the latter against a locating plate 80, best viewed in FIGURE 3. A stronger coil compression spring 82 seats at the other side of plate 80 and on the locking sleeve 34. The relative strengths of springs 78 and 82 is such as to constantly urge plate 80 and coupling member 72 inwardly away from the coupling position shown, wherein a tongue portion of the coupling member extends through a central aperture in plate 80 to have its tongue 86 couplingly engaged within a groove formed in the interior end of lock cylinder 38. However, plate 80 is held against the bias of spring 82 by a set of three shear pins 90 mounted equidistant about the bore of sleeve portion 24 and engaged with corresponding radial tabs 92 on plate 80, FIGURE 3. Accordingly, coupling member 72 is normally located in coupling position by the bias of spring 78. Locking sleeve 34 includes a corresponding set of axially extending bifurcated portions 94 embracing tabs 92 for rotational coupling between the sleeve and the plate and for normally holding the plate in the rotational position shown. A retaining member 100 includes axially extending fingers 102 holding the plate 80 concentric with the locking sleeve 34.

An annular flange 96 of the coupling member 72 is formed with a pair of axial projections 98 riding on plate 80 in the "off" position of the coupling member and which are projected into wing enlargements 104 of the central aperture of plate 80 when rotated to "on" position by the lock cylinder 38. These projections require a slight inward depression of the lock cylinder, sleeve 34, and coupling member 72 when it is desired to return to the "off" position. Slight inward axial end paly between the tabs 92 and the bifurcated portions 94 permits such slight depression.

Assuming now that the lock cylinder 38 has been authorizedly placed in locked position with side bar 40 extended, any unauthorized forced rotation of the lock cylinder by means of a screwdriver or otherwise, is met with the resistance of shear pin 36. Fracture of this shear pin at a predetermined load thereon less than that required for destruction of the side bar, allows sleeve 34 and the lock cylinder to rotate within housing sleeve portion 24. Plate 80 and coupling member 72 are also rotated until tabs 92 clear shear pins 90 so that spring 82 is permitted to force plate 80 and coupling member 72 axially inwardly until pin 76 enters a lost motion recess 106 in actuating member 42, wherein it is ineffective to rotate the actuating member.

Assuming again the original locked condition, an axial inward force on lock cylinder 34, as for example by hammer blows intended to shear side bar 40, results in the transmission of such force through sleeve 34 which bottoms on plate 80 to shear the pins 90. Shearing of these pins at a predetermined load less than that required for destruction of the side bar, again allows spring 82 to project coupling member 72 inwardly to locate the pin 76 thereof for free wheeling in the lost motion recess 106.

Having thus described the invention, what is claimed is:

1. A cylinder lock actuator comprising: housing means; a lock cylinder rotatably mounted in said housing means and including locking means adapted for authorized manipulation to unlock and lock said cylinder for and against actuating rotation within said housing means; a member to be actuated rotatably mounted on said housing means in axially spaced relation to said cylinder; coupling means for transferring actuating rotation of said cylinder to said member and being movable between coupling and uncoupling conditions; means biasing said coupling means to said uncoupling condition thereof; and releasable means holding said coupling means in coupling condition against the action of said biasing means, said releasable means including means intermediate said housing means and said coupling means holding the latter in coupling position except under the application of unauthorized rotation to said cylinder with a predetermined force less than the force required for destruction of said locking means, said releasable means further including means intermediate said housing means and said coupling means holding the latter in coupling position except under unauthorized axial displacement of said cylinder with a predetermined force less than the force required for destruction of said locking means.

2. A cylinder lock actuator as recited in claim 1 wherein said releasable means includes shear structure frangible under said predetermined unauthorized rotary or axial force on said cylinder.

3. A cylinder lock actuator as recited in claim 1 wherein said coupling means includes a coupling member movable between coupling and uncoupling positions, said releasable means including means associated with said cylinder for holding said coupling member in coupling position against the action of said biasing means when said cylinder is authorizedly rotated between locked and unlocked positions, said associated means being rotatable with said cylinder under unauthorized force rotation thereof from said locked position to release said coupling member for movement to the uncoupling position thereof by said biasing means.

4. A cylinder lock actuator as recited in claim 3 wherein said biasing means urges said coupling member axially of said lock cylinder, said releasable means further including radially projecting shearable means on said housing means engageable with said associated means in the predetermined locked position of said lock cylinder to hold said coupling member against movement axially from coupling position, said associated means being releasable from said radially projecting means upon unauthorized forced rotation of said cylinder from said locked position, said radially projecting means being frangible under predetermined axial force on said cylinder to release said coupling member for movement axially from coupling position.

5. A cylinder lock actuator as recited in claim 4, said releasable means further including shearable structure holding said associated means rotationally fixed except upon predetermined rotary force on said cylinder.

References Cited

UNITED STATES PATENTS 2,049,742  8/1936  Low _____ 70—379
2,609,679  9/1952  Bremer et al.

RICHARD E. MOORE, *Primary Examiner.*

ROBERT L. WOLFE, *Assistant Examiner.*

U.S. Cl. X.R.

70—252, 422